United States Patent [19]

Drutchas et al.

[11] E Re. 29,456

[45] Reissued Oct. 25, 1977

[54] PUMPS WITH SERVO-TYPE ACTUATION FOR CHEEK PLATE UNLOADING

[75] Inventors: Gilbert H. Drutchas, Birmingham, Mich.; George A. Berman, Lafayette, Ind.

[73] Assignee: TRW Inc., Cleveland, Ohio

[21] Appl. No.: 703,372

[22] Filed: July 8, 1976

Related U.S. Patent Documents

Reissue of:

[64] Patent No.: 3,822,965
Issued: July 9, 1974
Appl. No.: 303,115
Filed: Nov. 2, 1972

[51] Int. Cl.[2] ..... F04B 49/02

[52] U.S. Cl. ..... 417/53; 417/87; 417/283; 417/300; 417/310; 418/133; 418/135

[58] Field of Search ..... 417/53, 87, 283, 300, 417/301, 310; 418/131, 133, 135

[56] References Cited

U.S. PATENT DOCUMENTS

| | | | |
|---|---|---|---|
| 2,800,083 | 7/1957 | Tweedale et al. | 418/133 |
| 2,923,244 | 2/1960 | Dudley | 417/283 |
| 3,578,888 | 5/1971 | Adams | 418/133 |
| 3,728,046 | 4/1973 | Clark et al. | 417/300 |

*Primary Examiner*—Carlton R. Croyle
*Assistant Examiner*—G. P. LaPointe

[57] ABSTRACT

The pressure acting on a pressure loaded cheek plate in a pump is selectively vented by a servo valve actuated by the buildup of pressure in the pump outlet caused by normal parasitic losses in a downstream hydraulic flow circuit. Since it may be desirable to actuate the servo valve by the pressure drop across an orifice in the outlet line or by a suitable orifice in the pump return to pump, both embodiments are disclosed as exemplary means for achieving the premises of this design.

21 Claims, 11 Drawing Figures

Fig. 6
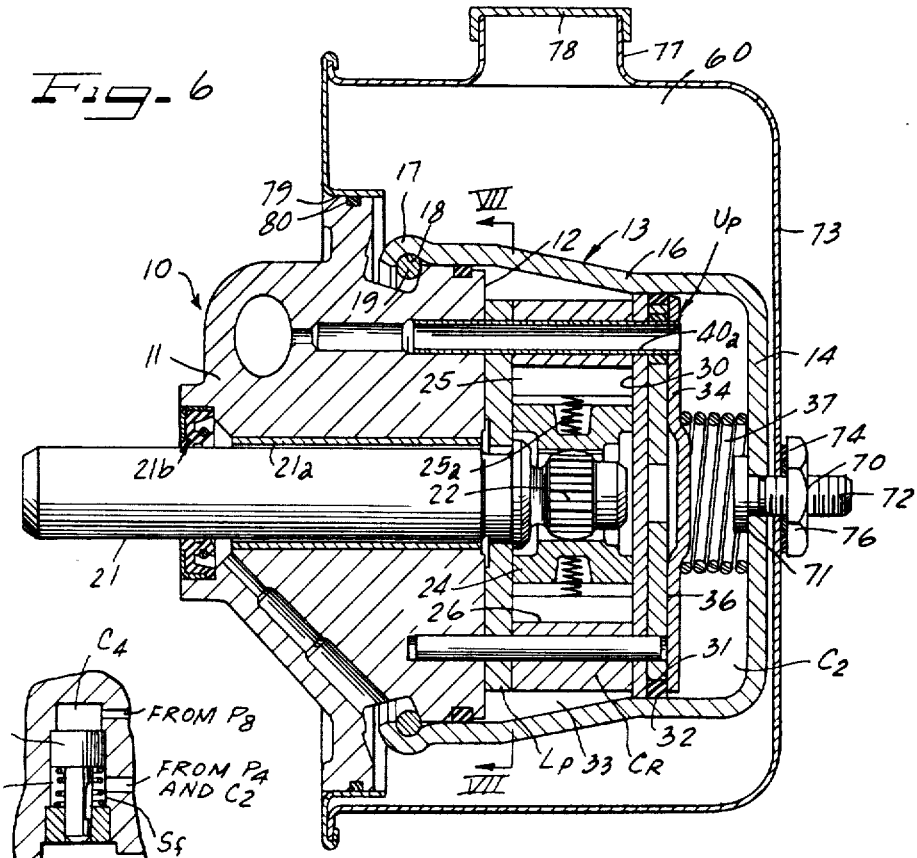
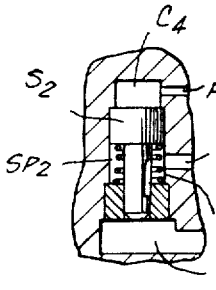
Fig. 9
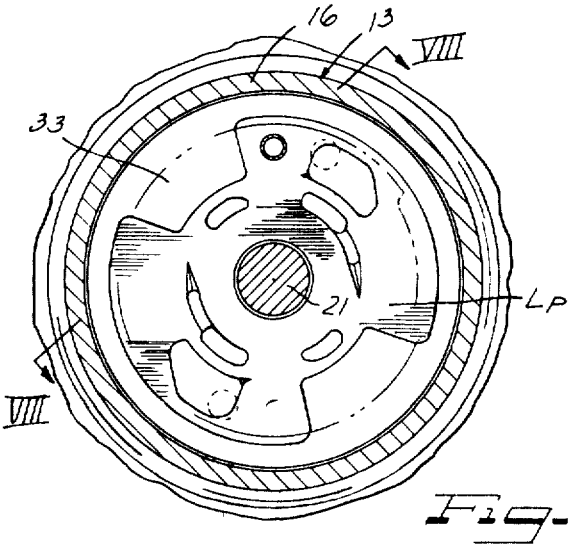
Fig. 7
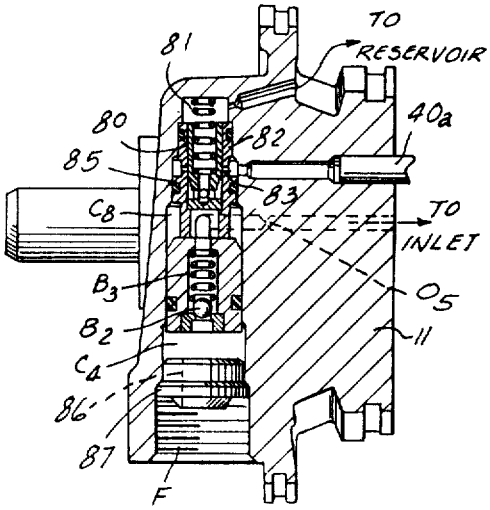
Fig. 8

PUMPS WITH SERVO-TYPE ACTUATION FOR CHEEK PLATE UNLOADING

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates generally to the control of flow and pressure relief functions in a pump and more particularly relates to a pump having an integral flow control arrangement incorporated therein.

2. Description of the Prior Art

The prior art is replete with pumps having integral flow control valves. However, most of these require the valve structure to by-pass the full pump output to inlet. Sometimes such a flow control valve is located exteriorly of the pump in a conduit leading to the point of utilization. In other forms of pump construction, the flow control valve is made a part of the pump package by being incorporated directly in passages of a pump housing, or in still other instances as an integral part of various components combined in a pumping cartridge. In either case, internal valve by-pass at top speeds may result in 30 to 40 gpm flowing through the valve with resulting high Bernoulli reaction forces developing. These forces require high counter spring forces to close the ports without sticking or valve hysteresis. Added spring force results in significant increases in flow orifice pressure drop and its outward token, heat rise; the latter resulting in significant cost imposts for oil coolers to secure safe heat levels, that will prevent component wear and hose failures.

Many means for limiting the tendency toward end seizure have been used in the art. Fixed end clearances carefully monitored by quality control methods are difficult to control and represent the largest single end sealing means. Flexible end plates made of bronze or other premium materials have also been successfully applied at cost premium to various designs. Neither alternative is totally ideal.

SUMMARY OF THE INVENTION

In accordance with the principles of the present invention, a completely different operating concept is favorably exploited. Thus, in accordance with the method and structure of the present invention a cheek plate with a sealing surface for establishing a seal between the inlet and outlet portions of the pump is pressure-loaded with fluid at pump-generated pressure.

In a first embodiment fluid discharged by the pump may be directed to pass through an orifice before proceeding to the gear or other motoring means.

A second embodiment directs the discharge to a point of utilization, and the spent fluid is returned through an orifice on the return line side of the pump.

In both cases, the resulting orifice drops are used to actuate a servo valve bias position in accordance with the changing pressure drops through an orifice with varying pump speed. The biasing of the servo valve opens a modulated passage area opening from the static chamber to the rear of the cheek plate to selectively vent this cavity. Since the pressure force at the rear of the cheek plate drops in accordance with the valve bias set by a servo valve spring and an orifice, flow control is achieved by the lifting of the cheek plate from the abutting cam sealing surface and the direct by-pass from outlet to inlet of the pump output above the flow control set point. As a result, flow control can be accomplished with a small servo valve which establishes together with the movable cheek plate a relationship similar to a servo ratio effect. In other words, a servo control system is provided wherein the servo valve operates as the master and the cheek plate operates as the slave. It is also clear, the absence of the conventional restricted egress and ingress through outlet or into inlet which is characteristic in all species of vane or gear pump designs, is effectively overcome by the unloading plate's lift, resulting in a superior pump internal pressure control, lower mechanical torque, and the lessening of cavitational tendencies. Supercharge is achievable in the "pressure orifice unloading plate design" by providing a series of nominally sized holes on the periphery of the shell connecting the reservoir to the interior pump plenum chamber at a point adjacent to the point where the rapidly expanding high velocity stream from the unloading plate by-pass is ejected.

Still another option is obtained by using the return line flow to aspirate the reservoir oil. The latter arrangement may be used to supercharge the return line orifice circuit in a similar manner.

The flow control concepts thus provided in accordance with the principles of the present invention have other important benefits. A valve can be provided which is either part of the same physical structure or separated. Still another salient point is that a trigger or full flow relief can be provided in either of the two embodiments described.

The lifting of the cheek plate above flow control or at pressure relief constitutes still another formidable advantage in the production, efficiency, and durability of the unloading plate concept.

Productively, the manufacturer may elect to build pumps with broader or closer end clearance ranges thereby availing himself of freedom from the threat of seizure. Moreover, efficiency rises as lower, closer end clearances are achievable. Durability and reliability are enhanced through the virtual elimination of end clearance seizure, i.e., the unloaded plate maintains an oil film surface with its adjacent counterpart, the rotor or gear.

It will be apparent to those skilled in the art that the unloading plate design is applicable to all rotating pumping types where the features ascribed above fall within the field of its operating matrix.

BRIEF DESCRIPTION OF THE DRAWINGS

FIG. 6 is a cross-sectional view generally similar to the arrangement of FIG. 1 but showing an alternative pump construction embodying the principles of the present invention and showing a reservoir surrounding the pump;

FIG. 7 is a cross-sectional view taken on line VII—VII of FIG. 6;

FIG. 8 is a cross-sectional view taken on line VIII—VIII of FIG. 7;

FIG. 9 is a cross-sectional view of an alternative pressure relief;

DESCRIPTION OF PREFERRED EMBODIMENTS

While the principles of the present invention are described herein in connection with a specific configuration of pump, namely, a pump of the type utilizing as pumping elements slippers which are free to move [radialy] *radially* and to rock angularly in following the adjacent bore wall contour, it should be understood that the principles of the present invention are applicable to any form of pump wherein a pumping chamber is provided with inlet and outlet portions and an adjoining cheek plate is pressure-loaded to seal such inlet and outlet portions from one another during normal pumping operations. For example, such pumps could include gear pumps, vane pumps, and other general forms of rotary fluid displacement means.

Figure 1:
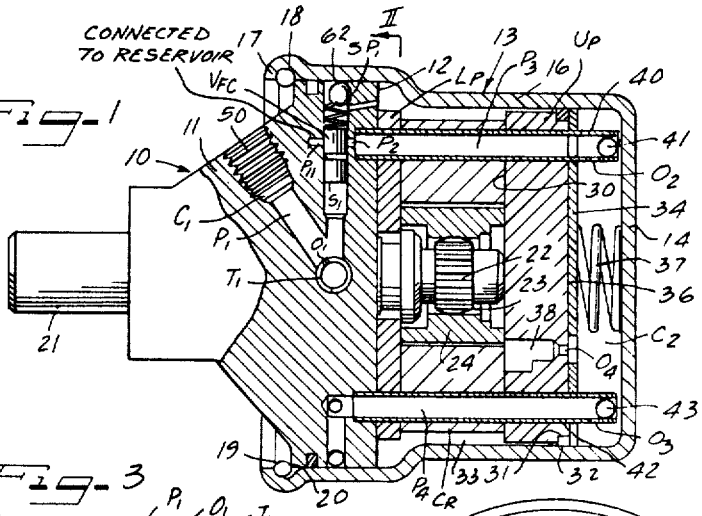
FIG. 1 is a cross-sectional view of a pump incorporating the principles of the present invention.

In FIG. 1, there is shown a pump indicated generally at 10 and comprising a housing 11 providing a flat end surface 12. A drawn steel shell 13 is of generally cup-shaped configuration and has an end wall 14 and side walls 16 terminating in an end flange 17 provided with an internal recess 18. The shell 13 fits over the housing 11 and a locking ring 19 seated in the groove 18 engages the housing as at 20, thereby to lock the same in assembly with one another.

Interiorly of the steel shell 13 there is provided a cartridge pack which constitutes the various elements or components forming a pumping unit. Thus, there is a lower pressure plate Lp disposed adjacent the surface 12. The components of the cartridge pack are arranged in an axial row and the next element is a cam ring Cr in which is formed a pumping chamber. A shaft 21 which may be rotated from a suitable power source, extends into the housing 11 and has a spline portion 22 interfitting with a correspondingly internally spline portion 23 of a rotor 24. The rotor has a plurality of circumferentially spaced notches and in each notch there is disposed a slipper 25 which operates to move fluid from an inlet portion of the pumping chamber to an outlet portion of the pumping chamber at increased pressure. As noted, the pump of the present invention may conveniently comprise pumping elements which are slippers of the type movable radially and rockable angularly as they follow the adjoining bore wall of the pumping chamber.

An upper pressure plate Up is provided which has a sealing face 30 on one side thereof adapted to engage the cam ring Cr and operating to seal the inlet portions of the pump from the outlet portions of the pump during normal pump operations.

The upper pressure plate Up is circumferentially notched as at 31 thereby to seat an O-ring sealing member 32, which sealing member 32 also engages the adjoining wall 16 of the shell 13, thereby to sealingly separate the inlet portions of the pump designated at 33 from the outlet cavity of the pump shown at C2.

A backing plate 34 engages against a rear surface of the upper plate Up which is shown at 36 and which constitutes a motive surface extending across the rear of the upper plate Up and thereby constituting one wall of the cavity C2 which, in effect, forms a pressure control chamber.

The various components of the cartridge pack which are disposed in an axial row are initially spring-biased by a coil spring 37 bottomed at one end against the wall 14 of the shell 13 and bottomed at its opposite end against the backing plate 34. Thus, all of the elements are held together upon pump start-up. As soon as the pump is in operation, fluid at pump-generated pressure is directed through a pump outlet port 38 through an orifice O4 into the cavity C2.

In accordance with the principles of the present invention, the elements of the cartridge pack are retained in alignment by means of dowel pins of special construction. Thus, it will be noted there is provided a dowel pin 40 which constitutes a hollow tube, thereby to provide an axially extending passage P3 through the interior thereof. A ball 41 seals the open end of the dowel pin 40, but there is formed an orifice O2 in the wall of the dowel pin, thereby communicating the passage P3 with the cavity C2.

Another dowel pin is shown at 42 and has a hollow tubular construction thereby to form an internal passage designated at P4. A ball 43 seals the end of the dowel pin 42, but there is also formed an orifice O3 which communicates the passage P4 with the cavity C2.

Figure 5:
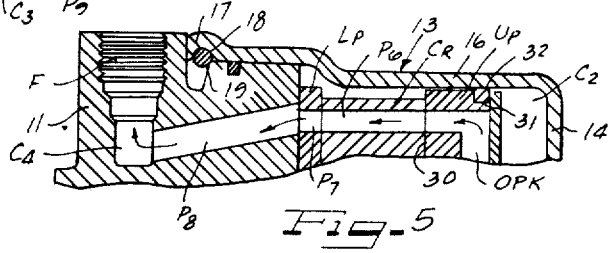
FIG. 5 is a fragmentary cross-sectional view illustrating additional details of the egress path provided in the pump of FIG. 1.

As shown in FIG. 5, the pump output is directed from the outlet port kidneys formed in the upper plate Up and designated at OPK through a passage hole formed in the cam ring Cr designated P6 through a passage P7 formed in the lower plate Lp and into a passage P8 of the housing 11 and into a cavity C4 which is in communication with an appropriate connecting outlet line adapted to be threaded into a fitting F of the housing 11. The fluid at pump generated pressure is thus directed to a point of utilization. For example, if the pump shown in the drawings is utilized as a power steering pump, the fluid is then directed to the power assisting device. After the fluid is spent and is returned, the return fluid is directed into a cavity C1 formed in the housing 11 in the bottom of a return line connection shown at 50 (FIG. 1). The return line flow entering the cavity C1 passes into a passage P1 formed in the housing 11 and thence passes through an orifice O1 formed in an exterior tube T1 as shown in the enlarged detail of FIG. 3. The tube T1 has concentrically telescoped therewithin a second tube T2 which is lanced as at 51 to form an opening 52 which is in register with the orifice O1. The lance 51 overlies the opening 52 and is disposed in front of the orifice O1, thereby to maintain laminar flow from the orifice O1 into the interior of the tube T2 so that a supercharge flow effect is generated by the orifice flow. Such flow effect induces flow through the tube T2 and a center passage P20 provided by the hollow interior of the tube T2 and which is connected to the reservoir 60. The flow momentum, resulting from this action, forces the supercharge flow via the passage P2 into the pump inlet Ip of the lower plate Lp.

With respect to the flow control action, it will be noted upon examining the drawings that the return line flow entering the cavity C1 in passing through the orifice O1 causes a pressure drop to register on the forepart of a flow control valve Vfc, which control surface is indicated at S1. The valve Vfc under the force of the flow drop, moves to open the pressure control chamber or rear cavity C2 behind the pressurized upper plate Up through a passage P2 which is controlled by the flow control valve Vfc, the passage P2 being in fluid communication with the passage P3 and the hollow dowel pin 40 and being connected to the cavity C2 by the orifice O2 and venting to a passage P11 which may be connected to a zone at lower pressure, for example, the reservoir. Thus, pressure in the cavity C2 drops and allows the upper pressure plate Up to move off of the cam surface provided by the cam ring Cr allowing outlet pressure to bypass directly to the inlet portions of the pump adjacent to the sealing face 30 of the upper pressure plate Up and also the adjoining faces of the rotor 24.

The flow control valve Vfc is initially spring biased with a control loading spring shown at Sp1. That spring is set in place by a ball retainer 62 (FIG. 1). Accordingly, the flow control valve Vfc can be preset with the use of small spring Sp1 and functions as a servo valve to regulate the pressure acting on the end plate or cheek plate formed by the upper pressure plate Up. It will be understood that the orifice O4 is smaller than both the orifice O2 and the orifice O3, thereby allowing the pressure in the cavity C2 to drop when the flow control valve Vfc is actuated. By virtue of such provision, the cheek plate operates as the slave of the servo valve which functions as the master in the servo control system.

Figure 4:
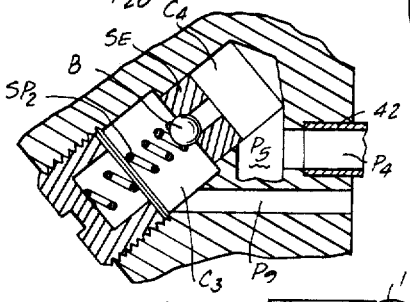
FIG. 4 illustrates one arrangement of pressure relief available in accordance with the teachings of the present invention.

In the form of the invention illustrated in FIG. 4, the pressure relief function occurs when the pressure in a cavity C4 which is connected to the cavity C3 via the orifice O3 in the dowel pin 42 and the passage P4 and passage P5 reaches relief pressure. A ball B moves off of a seat ring Se thereby compressing a spring shown at Sp2. Since the cvity C3 is connected to low pressure via a passage P9, the pressure level in the cavity C2 at the rear of the upper pressure plate Up is controlled at a pressure level set by the tension in the spring Sp2 which is the relief setting.

Referring now to FIGS. 6, 7 and 8, the structure of the pump is disclosed in somewhat more detailed fashion. However, since most of the elements correspond in structural configuration and function, like reference numerals will be used to identify like parts. Thus, there is a pump shown generally at 10 comprising a housing 11 providing a flat end surface 12. A drawn steel shell is again indicated generally at 13 and has an end wall 14 and side walls 16 which terminate in an end flange 17 forming an internal groove 18 in which is seated a locking ring 19 engaging an adjoining portion of the housing 11.

Figure 3:
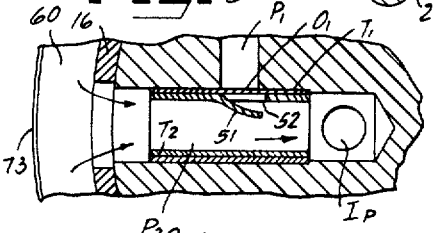
FIG. 3 is an enlarged fragmentary cross-sectional view showing additional details of the supercharging feature of the present invention.
Figure 2:
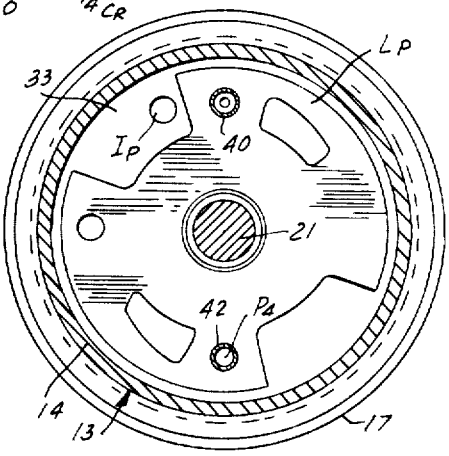
FIG. 2 is a cross-sectional view taken on line II—II of FIG. 1.

Interiorly of the shell 13 and cooperating with the housing 11 is a cartridge pack containing an axial row of pump components including a lower pressure plate Lp, a cam ring Cr and an upper pressure plate which is generally designated at Up but which may have bonded together parts forming a sealing face 30 and a backing plate 34 and a motive surface 36. An O-ring 32 is received in the outer portions of the upper pressure plate Up in a recess 31, thereby to sealingly separate an inlet portion 33 surrounding the cartridge pack and an outlet cavity C2 behind the pressure plate Up. A compression spring 37 is disposed between the wall 14 and the upper pressure plate Up to provide initial cartridge loading and biasing force. A stud 70 has a head 71 internally of the shell wall 14 and a threaded portion 72 extends outwardly for mounting purposes. A reservoir shell 73 is apertured to fit over the mounting stud 72 and a sealing gasket 74 is interposed between the reservoir shell 73 and a locking nut 76. The reservoir shell has a filling opening at 77 closed by a cap 78 and engages the housing 11 as at 79. An O-ring sealing member 80 completes the seal, thereby permitting the entire interior of the shell 73 to form a reservoir previously referred to by the reference numeral 60 (FIG. 3).

In the form of the invention illustrated in [IFG.] *FIG.* 6, the slippers are clearly shown at 25 and are biased radially outwardly by loading springs 25a. Further, the shaft 21 is shown journalled in a sleeve bearing 21a and a shaft seal is provided in the housing 11 as shown at 21b.

In the form of the invention shown in FIG. 6, the hollow dowel pin is shown at 40a and opens directly into the cavity C2. Referring now to FIG. 8, the cavity C4 receives fluid from the pump outlet ports and discharges the same through an opening 86 in a seat insert 87 located in the threaded fitting F. It will be noted that a flow control valve 80 is spring-biased by a flow control valve spring 81. The valve is of a generally tubular form spool but has a tapered surface 85. Moreover, the valve 80 moves in a sleeve 82 which provides a cylinder having lands and recesses for permitting the development of a valving action. Specifically, the sleeve 82 is provided with an orifice 83 which communicates with the passage extending through the dowel pin 40a, namely, the passage P3. Flow from the pump return line enters a cavity C8 and drops across an orifice to produce a pressure drop which will move the flow control valve 80. Because of the taper 81, the opening 83 will be opened gradually thereby venting the cavity C2 via the dowel passage P3. The tapered surface insures that the flow control valve 80 moves a significantly greater distance than the pressure plate Up moves to maintain the flow control level. This provides greater stability in the valving system and is somewhat similar to a servo ratio effect.

In the form of pressure relief shown in FIG. 6, such pressure relief is dependent upon the flow control valve. Flow enters the outlet cavity C4 (FIG. 8) from the outlet port responding to a demand from the point of utilization until it approaches relief pressure. At relief pressure, a ball B2 biased by a spring B3 lifts allowing flow to pass to the cavity C8 and the orifice O5, thereby triggering the flow control valve 80 to open in the manner described and by-pass directly across the sealing surface 30.

To provide pressure relief function independent of flow control the arrangement of FIG. 9 may be provided wherein the pressure in cavity C4 exceeds the setting of spring Sp2 moving the spool S2 and bringing a flute-like slot Sf into the cavity C5 which is at atmospheric pressure. The pressure level translated through the passage P4 from the cavity C2 drops to maintain the pressure in the cavity C4 in accordance with the pressure setting of the spring Sp2 thereby regulating pressure relief.

Figures 10, 11:
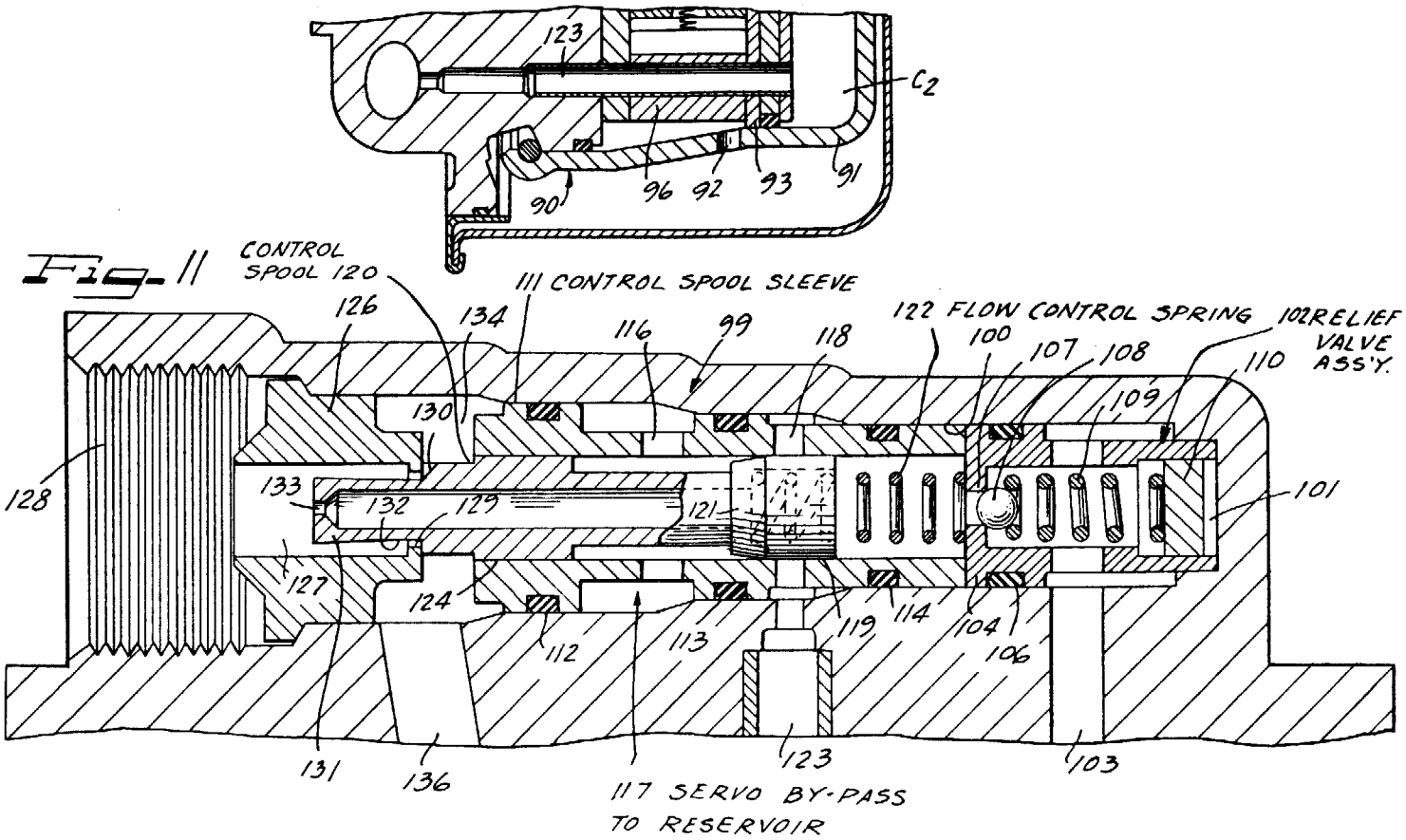
FIG. 10 is a fragmentary cross-sectional view somewhat similar to FIG. 1 but showing an alternative form of supercharging.
FIG. 11 is a cross-sectional view showing a pressure orifice circuit utilizing a servo valve in accordance with this invention.

Referring now to FIG. 10, a pump is shown at 90 having a shell 91 formed with holes 92 formed in the outside diameter of the shell 91 outwardly circumjacent the cheek plate 93. With this concept the holes 92 are conduits for flow of make-up fluid from the reservoir R enclosed between the shell 91 and a cam 94. The first by-pass over the cam ring 96 from the plate lift inducts oil from the reservoir R to accomplish supercharge.

In FIG. 11, a pressure orifice circuit arrangement is shown. A pump housing 99 has a successively counterbored recess 100 terminating in an end wall 101 bottoming a relief valve assembly 102. A passage 103 in the housing 100 returns flow from the relief valve to the reservoir. A sleeve 104 is sealed in the recess 100 by an O-ring sealing member 106 and also forms a valve seat 107 for a valve ball 108 spring-pressed toward closed position by a relief valve spring 109, the other end of which is bottomed against a closure plug 110.

A control spool sleeve 111 is sealed in the recess 100 by three longitudinally spaced O-ring sealing members 112, 113 and 114. One or more openings 116 communicate the interior of the sleeve 111 to an annular servo by-pass leading to the reservoir and which annular by-pass recess is shown at 117 formed between the sealing members 112 and 113.

One or more openings 118 formed in the sleeve 111 between the sealing members 113 and 114 forms a valving recess controlled by a corresponding valve land 119 formed on one end of a control spool 120 axially movable inside of the sleeve 111. The spool 120 has a hollow interior formed with a shoulder 121 which bottoms one end of a coil spring 122, the other end being bottomed against the sleeve 104, thereby tending to load the control spool 120 in one direction. The valving recess and openings 118 communicate with a passage 123 corresponding to the passage 40a already described, thereby constituting a static chamber conduit leading to a static chamber corresponding to C2.

The control spool 120 has a front land 124 slidably engaging the sleeve 111 inwardly of the O-ring seal 112.

A seat insert 126 is formed with a passage 127 leading to a pump outlet 128 and also has a throat 129 at one end forming a sized opening. The control spool 120 has a valve head 130 which seats against the edges of the throat 129 thereby closing the sized opening and has a stem 131 projecting through the opening. The stem 131 is tapered as at 132 and has a sense opening 133 formed in the end wall.

An annular space axially inwardly of the seat insert 126 is shown at 134 and constitutes a pressure cavity corresponding to C4 receiving fluid from the pump outlet ports through a passage 136.

The control spool 120 operates as a servo valve and the stem 131 on the spool 120 serves two purposes. Firstly, it allows a sense to be established at the rear valve cavity without drilling difficult hole patterns to connect the fore and rear parts of the valve. Secondly, the stem 131 provides a means for setting up a tapered pin via the tapered surface 132 through an orifice provided by the throat opening 129, thereby to achieve a drooping flow characteristic, if necessary or desirable.

In operation, the pressure drops across the orifice 129 actuate the servo valve spool 120 to different bias positions in accordance with the varying pump speed. The biasing of the servo valve opens a modulated passage 123 opening from the static chamber C2 to the rear of the cheek plate 93 to selectively vent such chamber. Since the pressure force at the rear of the cheek plate drops in accordance with the valve bias set by the spring 122 and the orifice 129, flow control is achieved by the lifting of the cheek plate 93 from the abutting cam sealing surface of the cam ring 96 and the direct by-pass from outlet to inlet of the pump output exceeding the flow control set point. Thus, flow control is achieved with a small servo valve which together with the movable cheek plate 93 establishes a relationship similar to a servo ratio effect.

Although various minor modifications might be suggested by those versed in the art, it should be understood that we wish to embody within the scope of the patent warranted hereon all such modifications as reasonably and properly come within the scope of our contribution to the art.

What we claim as our invention:

[1. The method of flow control in a rotary pump which comprises the steps of metering fluid at pump generated pressure into a static cavity, pressure loading a cheek plate with fluid in said static cavity to form a seal between the inlet and outlet portions of the rotary pump, driving the fluid through a pumping circuit by directing the fluid discharged by the pump at pump-generated pressure to a point of utilization and returning the spent fluid to the pump, sensing a pressure gradient on opposite sides of an orifice in the pumping circuit, selectively venting the pressure in the static cavity acting on the cheek plate by using a servo valve as a master valve to produce a slave valve actuation of the cheek plate, and actuating the servo valve in accordance with the changing pressure drop through the orifice occurring with varying pump speed, thereby modulating pump output flow by unloading the cheek plate and allowing the outlet portions of the pump to by-pass directly to the inlet portions thereof at the cheek plate.]

[2. The method of claim 1 and further characterized by actuating the servo valve by the pressure drop across an orifice in the outlet line.]

[3. The method of claim 1 and further characterized by actuating the servo valve by the pressure drop across an orifice in the pump return line.]

[4. In a pump having a non-rotatable axially movable pressure-loaded cheek plate sealing the respective inlet and outlet portions in a pump containing rotary fluid displacement means, the improvement of means forming a static cavity behind said cheek plate, means forming a venting passage from the static cavity to a zone at a reduced pressure, pumping circuit means forming a pump output and a pump return for placing the pump in a pumping circuit, means forming a flow control orifice in said pumping circuit means, a servo valve for controlling said venting passage and thus venting the pressure in said static cavity acting on the cheek plate, whereby the cheek plate will act as a slave and the servo valve will act as the master to establish a servo ratio effect, and means for referencing the servo valve to the pressure drop across said orifice, whereupon unloading the cheek plate the outlet portions of the pump will be bypassed directly to the inlet portions thereof to modulate the pump flow output.]

[5. In a pump as defined in claim 4, said means forming an orifice forming said orifice in the return line of the pump and through which spent fluid is directed on the return line side of the pump.]

[6. In a pump as defined in claim 4, said means forming an orifice forming said orifice in the outlet line of the pump through which fluid discharged by the pump is directed before proceeding to a motoring means.]

[7. In a fluid pump as defined in claim 4, said servo valve comprising a spool valve having a tapered spool movable in a bore having lands and recesses, spring means initially loading said spool in one direction, said spool controlling the venting passage by gradually opening the passage due to the tapered configuration, thereby to produce an axial movement of the cheek plate but through a significantly lesser distance than the corresponding movement of the spool to maintain a flow level corresponding to a servo ratio effect in the flow regulation of the pump.]

[8. In a pump as defined in claim 4 and further characterized by means forming a metering passage from a source of pump generated pressure to said static cavity, and means forming a metering orifice for said metering passage.]

9. In combination, a pump having housing means forming a pumping chamber having inlet and outlet portions, rotary fluid displacement means in said pumping chamber for moving the fluid at increased pressure from the inlet to the outlet portions, a cheek plate adjacent said pumping chamber having a sealing face for sealing the inlet and outlet portions during operation of the pump, means including said housing forming a static pressure control chamber behind said cheek plate and having an orificed metering passage to load said cheek plate with fluid at pump-generated pressure,

*a seal between said cheek plate and said housing blocking flow into said cavity except through said orificed metering passage,* means including said housing forming a pumping circuit including an outlet line and a return line for said pump receiving said spent fluid returned to the pump, means forming an orifice in said pumping circuit, and a servo valve controlling a venting passage in said housing venting said pressure control chamber to a zone at lower pressure and having actuating means responsive to the pressure drop across said orifice, thereby valving the cheek plate in servo ratio proportion with the servo valve and directly by-passing the outlet portions of the pump to the inlet portions adjacent the sealing face of the cheek plate to modulate pump flow output.

10. A pump as defined in claim 9 wherein said orifice is formed in said return line and through which spent fluid is directed on the return line side of the pump.

11. A pump as defined in claim 9 wherein said orifice is formed in the outlet line of the pump and through which fluid discharged by the pump is directed before proceeding to a point of utilization.

12. The invention of claim 9 and further characterized by a hollow dowel pin extending through said cheek plate and into said housing means and forming a passage extending therethrough communicating at one end with said pressure control chamber, said servo valve controlling said passage at the other end of said passage in said dowel pin for selectively venting the pressure control chamber to a zone of reduced pressure, whereupon unloading of the cheek plate will by-pass the outlet portion to the inlet portions directly across the sealing face of the cheek plate.

13. In a pump having an axial row of parts including a cam ring forming a pumping chamber and an end plate formed with a sealing face adjacent the cam ring and means forming a pressure control chamber behind the end plate, the improvement of hollow dowel pin means extending through the axial row of parts and having formed therein a venting passage communicating at one end with the pressure control chamber, orifice means for sensing a pressure gradient in the pump, and a servo valve in the pump responsive to changes in the pressure gradient controlling the other end of the venting passage to a zone of reduced pressure, thereby to selectively unload the end plate for by-passing the outlet portions of the pump directly to the inlet portions of the pump adjacent the sealing face.

14. In a pump having a return line, a valve in said return line having a tapered spool movable in a valve bore having lands and recesses, spring means initially loading said spool in one direction, means forming an orifice in said return line through which fluid in the return line is directed, said spool being movable as a function of the pressure drop across said orifice, and by-pass means comprising a pressure-loaded end plate having a sealing face forming one wall of a pumping chamber and having a motive surface loaded by fluid at pump-generated pressure, a venting passage for venting the pressure acting on said motive surface, said valve controlling said venting passage by gradually opening the passage due to the tapered surface, thereby to trigger a movement of the end plate to directly by-pass the outlet portions of the pump to the inlet portions thereof, said valve moving a significantly greater distance than said end plate to maintain a flow level, thereby to provide a servo ratio effect in the flow control regulation of said pump.

15. In a pump,

*a housing,* a cam ring *in said housing* forming a pumping chamber for a fluid displacement means operable in said pumping chamber, a cheek plate for sealing against said cam ring, thereby to seal the pumping chamber,

[means including] *said housing and* said cheek plate forming a static chamber receiving fluid at pump-generated pressure and whereby said cheek plate is pressure-loaded against said cam ring, and venting means for said chamber including a venting passage and a servo valve in control of said venting passage and forming the master valve of a control system wherein the cheek plate forms a slave valve,

*means for sealing said static chamber against fluid flow except for said venting means and said fluid receiving means in said static chamber including a seal between said housing and said cheek plate,* orifice means externally of said static chamber in the pumping circuit of the pump for developing a pressure gradient independently of the pressure in said static chamber upon buildup of pressure in the pump outlet caused by normal parasitic losses in a downstream hydraulic flow circuit, and means for actuating said servo valve as a function of the pressure drop across said orifice means, thereby to vent said chamber to unload the cheek plate *resulting in movement of said cheek plate relative to said housing and modulation of* [and modulate] pump flow output.

16. In a pump as defined in claim 15, said servo valve being actuated by pressure drop across an orifice formed in the outlet line of the pump and through which fluid at pump-generated pressure is directed.

17. In a pump as defined in claim 15, said servo valve being actuated by pressure drop across an orifice formed in the return line of the pump and through which spent fluid is directed on the return line side of the pump.

18. In a pump as defined in claim 15, housing means and reservoir means successively outwardly adjacent said cam ring, and openings in said housing means forming conduits for flow from the reservoir and being disposed so that the fast by-pass over the cam ring from the plate lift inducts out from the reservoir to accomplish super-charge.

19. The method of flow control in a pump which comprises the steps of pressure loading a cheek plate with fluid at pump-generated pressure to form a seal between the inlet and outlet portions of the pump, directing the fluid discharged by the pump at pump-generated pressure to a point of utilization and returning the spent fluid to the pump, sensing a pressure gradient on opposite sides of an orifice, selectively venting the pressure acting on the cheek plate by using a servo valve, and actuating the servo valve in accordance with the changing pressure drop through the orifice occurring with varying pump speed, thereby to unload the cheek plate and allowing the outlet portions of the pump to by-pass directly to the inlet portions thereof at the cheek plate, said method being further characterized by actuating the servo valve by the pressure drop across an orifice in the pump return line.

20. In a pump having a pressure-loaded cheek plate sealing the respective inlet and outlet portions of a pumping chamber containing fluid displacement means, the improvement of a servo valve for venting the pressure acting on the cheek plate, means forming an orifice in the return line of the pump and through which spent fluid is directed on the return line side of the pump, and means for referencing the servo valve to the pressure drop across said orifice, whereby upon loading the cheek plate the outlet portions of the pump will be by-passed directly to the inlet portions thereof.

21. In combination, a pump having housing means forming a pumping chamber having inlet and outlet portions, rotary fluid displacement means in said pumping chamber for moving the fluid at increased pressure from the inlet to the outlet portions, a cheek plate adjacent said pumping chamber having a sealing face for sealing the inlet and outlet portions during operation of the pump, means including said housing forming a pressure control chamber behind said cheek plate to load said cheek plate with fluid at pump-generated pressure, means including said housing forming a return line for said pump receiving spent fluid returned to the pump, means forming an orifice in said return line and through which spent fluid is directed on the return line side of the pump, and a servo valve controlling a passage in said housing venting said pressure control chamber to a zone at lower pressure in response to the pressure drop across said orifice, thereby unloading the cheek plate and directly by-passing the outlet portions of the pump to the inlet portions adjacent the sealing face of the cheek plate.

*22. In a pump having a nonrotatable axially movable pressure-loaded cheek plate sealing the respective inlet and outlet portions in a pump containing rotary fluid displacement means, the improvement of*

*means forming a static cavity behind said cheek plate,*

*means forming a venting passage from the static cavity to a zone at a reduced pressure,*

*pumping circuit means forming a pump outlet and a pump return for placing the pump in a pumping circuit,*

*means forming a flow control orifice in said pumping circuit means,*

*a servo valve for controlling said venting passage and thus venting the pressure in said static cavity acting on the cheek plate,*

*whereby the cheek plate will act as a slave and the servo valve will act as the master to establish a servo ratio effect,*

*and means for referencing the servo valve to the pressure drop across said orifice, whereupon unloading the cheek plate the outlet portions of the pump will be by-passed directly to the inlet portions thereof to modulate the pump flow output,*

*said means forming an orifice forming said orifice in the return line of the pump and through which spent fluid is directed on the return line side of the pump.*

*23. In a pump having a nonrotatable axially movable pressure-loaded cheek plate sealing the respective inlet and outlet portions in a pump containing rotary fluid displacement means, the improvement of*

*means forming a static cavity behind said cheek plate,*

*means forming a venting passage from the static cavity to a zone at a reduced pressure,*

*pumping circuit means forming a pump output and a pump return for placing the pump in a pumping circuit,*

*means forming a flow control orifice in said pumping circuit means,*

*a servo valve for controlling said venting passage and thus venting the pressure in said static cavity acting on the cheek plate,*

*whereby the cheek plate will act as a slave and the servo valve will act as the master to establish a servo ratio effect,*

*and means for referencing the servo valve to the pressure drop across said orifice, whereupon unloading the cheek plate the outlet portions of the pump will be by-passed directly to the inlet portions thereof to modulate the pump flow output,*

*said servo valve comprising a spool valve having a tapered spool movable in a bore having lands and recesses,*

*spring means initially loading said spool in one direction, said spool controlling the venting passage by gradually opening the passage due to the tapered configuration,*

*thereby to produce an axial movement of the cheek plate but through a significantly lesser distance than the corresponding movement of the spool to maintain a flow level corresponding to a servo ratio effect in the flow regulation of the pump.*

*24. In a pump having a nonrotatable axially movable pressure-loaded cheek plate sealing the respective inlet and outlet portions in a pump containing rotary fluid displacement means, the improvement of*

*means forming a static cavity behind said cheek plate,*

*means forming a venting passage from the static cavity to a zone at a reduced pressure,*

*pumping circuit means forming a pump output and a pump return for placing the pump in a pumping circuit,*

*means forming a flow control orifice in said pumping circuit means,*

*a servo valve for controlling said venting passage and thus venting the pressure in said static cavity acting on the cheek plate,*

*whereby the cheek plate will act as a slave and the servo valve will act as the master to establish a servo ratio effect,*

*means for referencing the servo valve to the pressure drop across said orifice, whereupon unloading the cheek plate the outlet portions of the pump will be by-passed directly to the inlet portions thereof to modulate the pump flow output,*

*means forming a metering passage from a source of pump generated pressure to said static cavity,*

*and means forming a metering orifice for said metering passage.*

*25. A pump for supplying fluid to a system comprising,*

*a housing having an inlet and an outlet, said housing defining a pumping chamber,*

*pumping means in said chamber operable to pump fluid from said inlet to said outlet, said pumping means including pumping elements which define a series of pumping pockets which expand and contract to effect pumping of fluid,*

*a cheek plate having one axial side adjacent to and facing said pumping means and being supported in said housing, said cheek plate having a sealing position blocking fluid communication between said pockets and being axially movable therefrom to enable fluid to flow directly between said pockets and by-pass the system,*

*spring means for biasing said cheek plate into said sealing position,*

*said housing at least in part defining a cavity on the other axial side of said cheek plate,*

*a fluid passage for directing a flow of fluid from said outlet into said cavity for urging with said spring means said cheek plate into said sealing position,*

*a seal between said cheek plate and said housing blocking flow into said cavity except through said fluid passage, an orifice in said outlet and through which fluid flows to the system,*

*valve means for venting the fluid pressure in said cavity to enable said cheek plate to move away from said pumping means, said valve means including a movable valve member having surfaces acted upon by fluid pressures on opposite sides of said orifice and which is movable to control the pressure in said cavity to control the position of said cheek plate and thereby control the flow of fluid to the system.*

*26. A pump as defined in claim 25 wherein said valve means comprises a valve spool movable to vent said cavity to said inlet to enable said cheek plate to move axially away from said pumping means and wherein said orifice is defined by a surface portion carried by said valve spool and a surface portion carried by said housing.*

*27. A pump as defined in claim 25 wherein said valve means comprises a valve spool having at least two axially spaced lands, a first land cooperating with a first port communicating with said cavity and which when moved past said first port creates a fluid flow from said cavity through said port past said land, and a second land for at least temporarily blocking communication between the pump outlet and pump inlet.*

*28. A pump as defined in claim 27 wherein said valve spool is located in axial alignment with said orifice, and said valve spool has a projection extending therefrom, said orifice being defined in part by the outer surface of said projection, said projection having a passage therethrough for communicating the system pressure on one side of said orifice to one portion of the valve spool while outlet pressure on the other side of said orifice acts on another portion of said valve spool.*

*29. A pump as defined in claim 28 wherein said cheek plate is nonrotatable and said fluid passage for directing flow into said cavity comprises a passage through said cheek plate and which passage has an orifice therein.*

* * * * *